July 9, 1957
P. C. SMITH
2,798,730
ADJUSTABLE BABY STROLLER
Filed Aug. 13, 1954
3 Sheets-Sheet 1
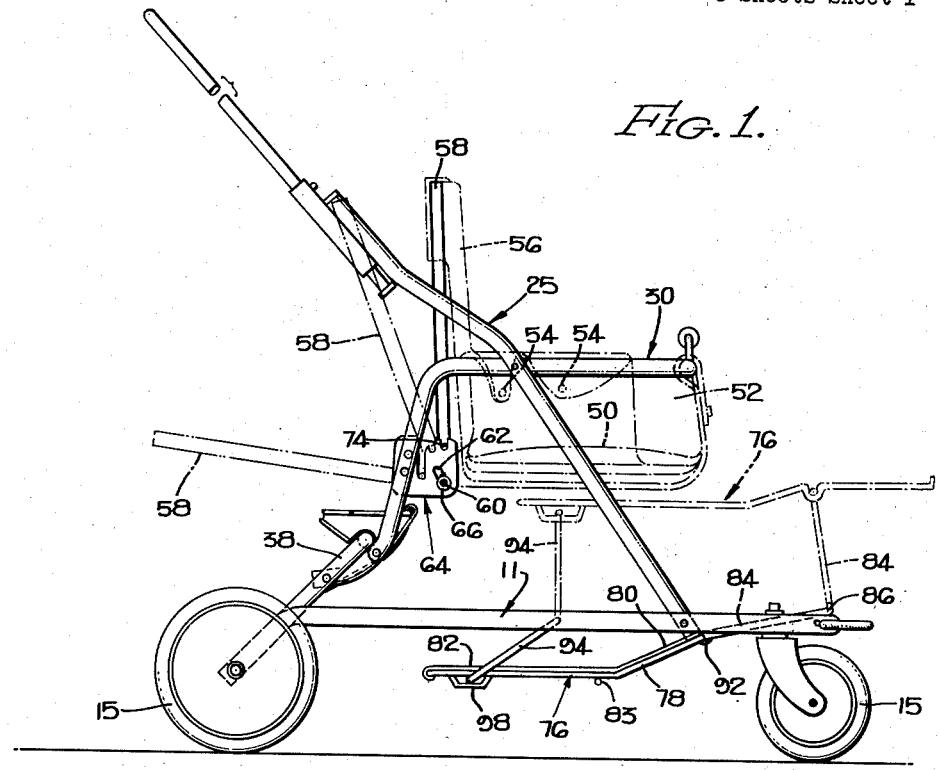
Fig. 1.
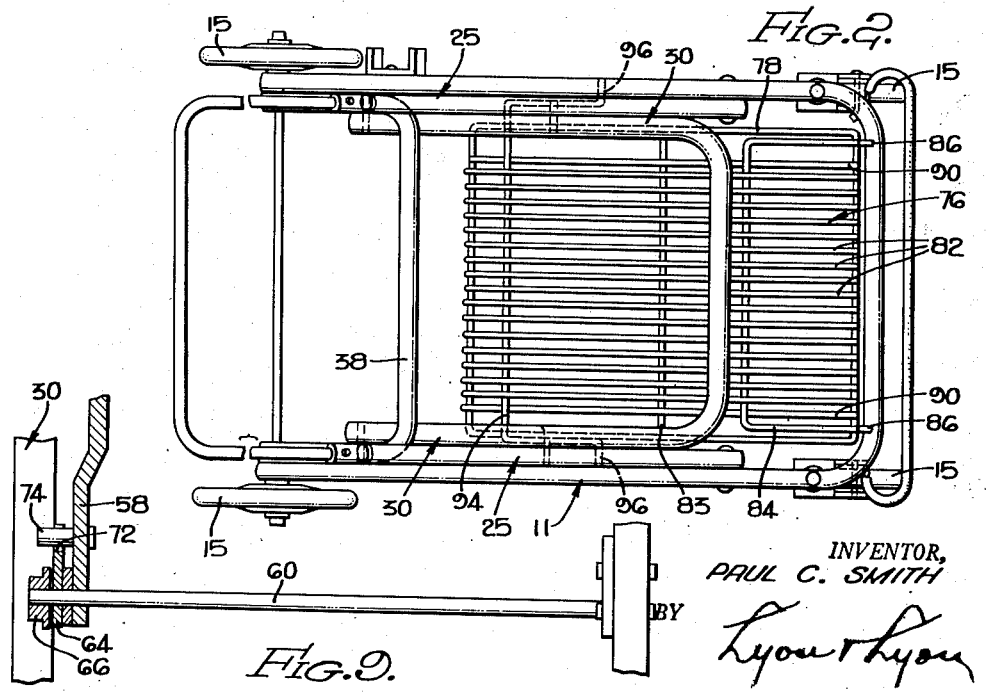
Fig. 2.
Fig. 9.
INVENTOR,
PAUL C. SMITH
BY
Lyon & Lyon
ATTORNEYS July 9, 1957
P. C. SMITH
2,798,730
ADJUSTABLE BABY STROLLER
Filed Aug. 13, 1954
3 Sheets-Sheet 2
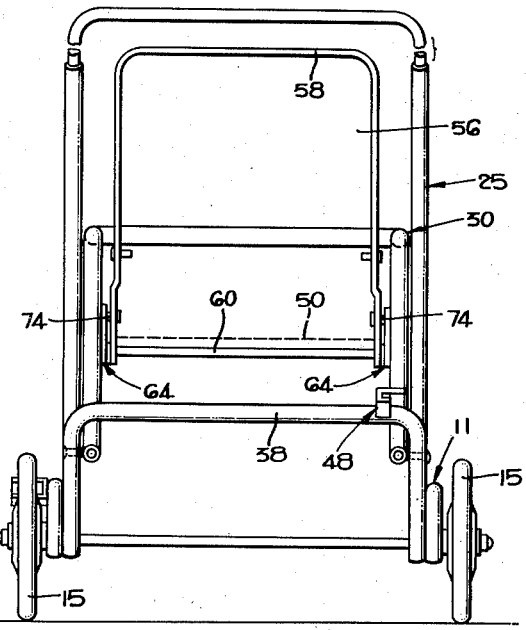
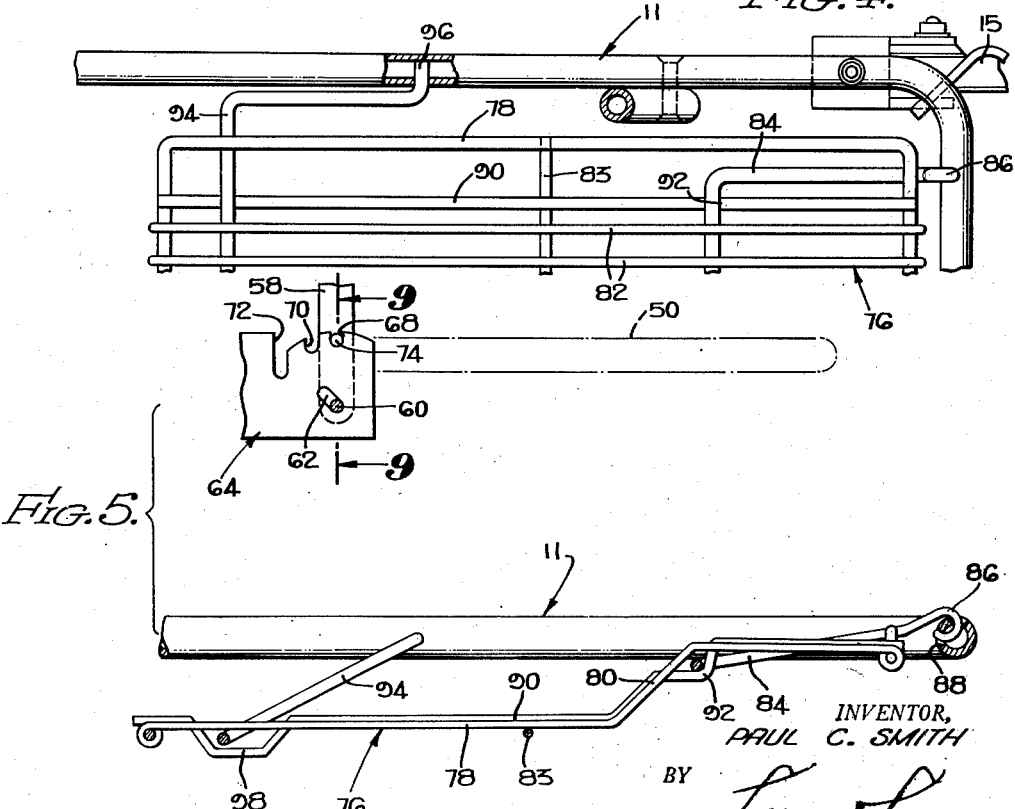
INVENTOR,
PAUL C. SMITH
BY
Lyon & Lyon
ATTORNEYS July 9, 1957 P. C. SMITH 2,798,730
ADJUSTABLE BABY STROLLER
Filed Aug. 13, 1954 3 Sheets-Sheet 3
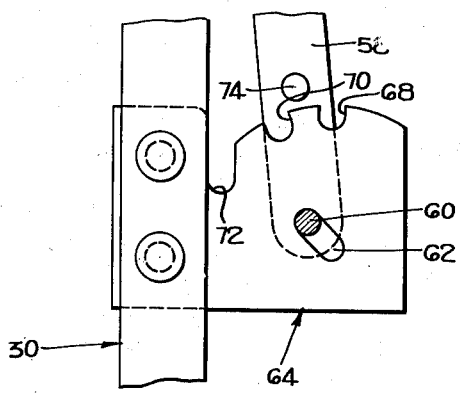
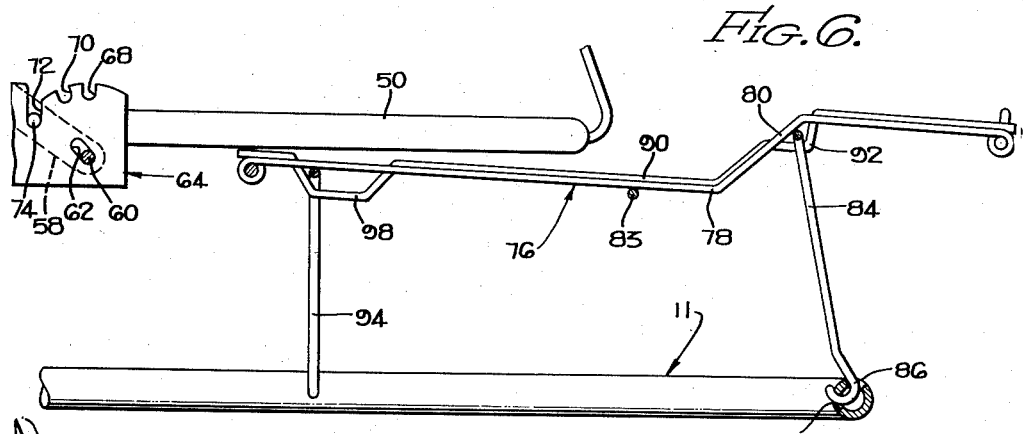
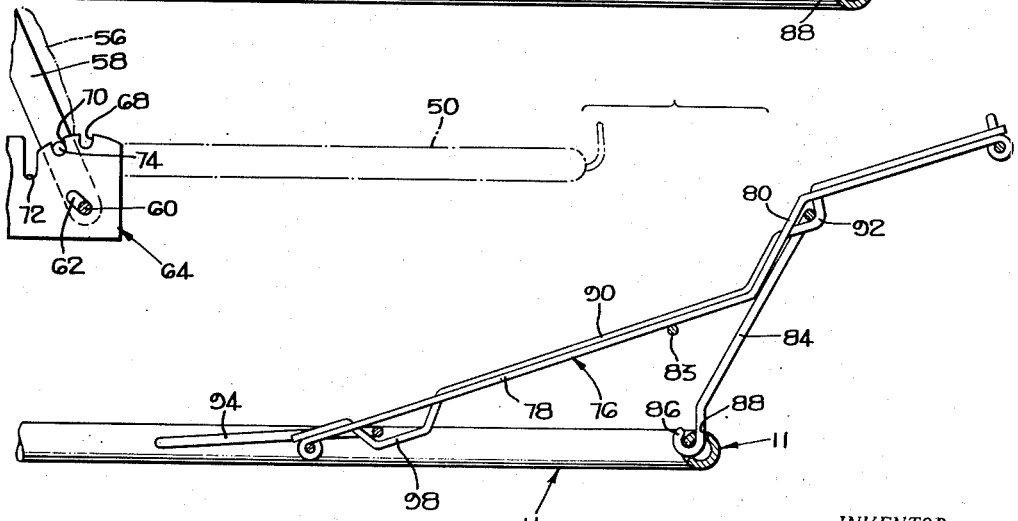
INVENTOR,
PAUL C. SMITH
BY
ATTORNEYS

United States Patent Office 2,798,730
Patented July 9, 1957

2,798,730
ADJUSTABLE BABY STROLLER

Paul C. Smith, Pacific Palisades, Calif., assignor to Strolee of California, Inc., Los Angeles, Calif., a corporation of California Application August 13, 1954, Serial No. 449,616

16 Claims. (Cl. 280—36)

This invention relates to an improved baby stroller.

It is an object of this invention to provide a stroller of the type for wheeling babies about in a sitting position.

It is still a further object of this invention to provide an adjustable seat to accommodate a baby in a reclined or intermediate position as well as seated.

It is still a further object of this invention to provide adjustable foot rest means which will support the feet of an infant in any position of the seat.

Other objects and advantages will be readily apparent from the following description.

In the drawings:

Figure 1 is a side elevation of a stroller embodying this invention.

Figure 2 is a top plan view of the stroller with the seat and back rest removed.

Figure 3 is a rear elevation with the seat and back removed.

Figure 4 is an enlarged fragmentary plan view of the foot rest and its support.

Figure 5 is a diagrammatic view of the back rest and foot rest in the seating position.

Figure 6 is a diagrammatic view similar to Figure 5 with the back rest and foot rest in the fully reclined position.

Figure 7 is a diagrammatic view similar to Figure 5 with the back rest and foot rest in the intermediate position.

Figure 8 is an enlarged fragmentary view of the back rest positioning means.

Figure 9 is a section taken along line 9—9 of Figure 5.

This invention is an improvement upon the strollers described and claimed in the copending applications of Leon Preisler and Samuel M. Shone, Serial No. 335,732 for a Baby Stroller, filed February 9, 1953, now Patent No. 2,728,580, dated December 27, 1955, and Leon Preisler, Serial No. 424,841 for a Baby Stroller, filed April 22, 1954, now abandoned.

The construction of the stroller, with the exception of the seat, foot rest, latch means and expansible handle, is identical to that described in above-identified copending application Serial No. 335,732, comprising generally U-shaped base frame 11, mounted on wheels 15, U-shaped handle frame 25, arm rest frame 30, which has pivotally connected thereto U-shaped toggle bar 38. The collapsible action of the stroller is set forth in full detail in copending application Serial No. 335,732.

The construction and functioning of latch 48 is fully described in copending application Serial No. 424,841, as more fully identified above, as well as the expansible handle frame 25.

This present invention is directed to the construction and operation of the seat and foot rest which have been installed in a stroller of the above-identified type.

The seat 50 is suspended from arm rest 30 by cloth sides 52, which fold over arm rest 30 and snap onto a suitable snap 54 on the sides. A back rest 56 is provided having a U-shaped frame 58 which carries a cross bar 60. The cross bar has its ends projecting through slots 62 of bracket 64. The brackets 64 are mounted upon arm rest frame 30 and cross bar 60 has a cap 66 on each extremity to prevent disassembly. The brackets 64 each have three grooves 68, 70 and 72 in the upper periphery thereof. The U-shaped frame 58 carries a pair of pins 74 which selectively enter any of the grooves 68, 70 or 72. The slots 62 are of sufficient length to permit cross bar 60 to be raised a sufficient amount to permit the pins 74 to clear the bracket 64 as illustrated in Figure 8.

When the pins are in grooves 68, as illustrated in Figure 5, the back rest 56 is approximately vertical or in the seating position, as indicated by the solid lines in Figure 1. When the pins are in grooves 72, as in Figure 6, the back rest 56 is substantially horizontal or in the reclined position, as indicated by the phantom lines furthest away from the seating position in Figure 1. When the pins are in grooves 70, as illustrated in Figure 7, the back rest is in the intermediate position.

The foot rest generally designated 76 has a rectangular frame 78 when viewed from above, which frame has an inclined step 80 when viewed from the side. The frame has a plurality of spaced rods 82 supported between opposed sides of the frame and strengthened by cross rod 83.

The foot rest is mounted upon the base frame 11 by means of two U-shaped support rods. The front rod 84 has a pair of hooks 86 which pass through suitable apertures 88 in frame 11. The rod 84 passes beneath rods 82 with the exception of a pair of such rods designated 90 which are crimped as at 92, to pass beneath rod 84. The U-shaped rear support rod 94 has its extremities bent outwardly as at 96, which extremities project into suitable apertures on opposite sides of base frame 11. The rods 90 are crimped as at 98 to pass beneath support rod 94, while the remaining rods 82 are above same. In this manner the foot rest 76 is movably mounted upon frame 11.

When the support rods are pivoted to the position illustrated in Figure 5, the frame 78 engages support rod 84, preventing further lowering of the front end of the foot rest, maintaining same in a substantially horizontal plane suitable for supporting the legs of an infant while in the seated position with the back rest substantially vertical as seen in Figure 5.

From this position if the foot rest is moved manually upwardly and forwardly it will remain in a substantially horizontal plane however raised with respect to frame 11. The foot rest will assume a position immediately below seat 50 suitable for supporting the legs of an infant lying on its back in the seat with the back rest in its furthest back position, as seen in Figure 6. At this position the U-shaped support rod 94 will engage the handle frame 25 above the base frame 11, preventing further movement forwardly of the foot rest.

If the foot rest 76 in Figure 5 is grasped manually and the front extremity lifted off U-shaped support rod 84, the rear U-shaped support rod pivots counterclockwise in Figure 5 until same strikes the handle frame 25. The foot rest then assumes the position illustrated in Figure 7 the desired distance to support an infant's feet when the back rest 56 is pivoted to the intermediate position.

In this manner a stroller is formed which will accommodate an infant while seated, lying down or in an intermediate position, while the foot rest can be adjusted to support the infant's legs in each of the positions.

While what hereinbefore has been described is the preferred embodiment of this invention, it is readily apparent that alterations and modifications can be restored to without departing from the scope of this invention and such alterations and modifications are intended to be included within the scope of the appended claims.

I claim:
1. In a baby stroller of the type having a base frame and an arm rest frame positioned above said base frame, the combination of a seat suspended from said arm rest frame, a back rest pivotally mounted with respect to said seat, means limiting pivoting of said back rest from a substantially vertical position to a substantially horizontal position, a foot rest having a pivotal link connection adjacent each end thereof with said base frame to enable said foot rest to move from a lower substantially horizontal position below said seat to support an infant's feet when said back rest is substantially vertical to an upper substantially horizontal position to support an infant's feet when the back rest is substantially horizontal forming an extension of said seat.

2. In a baby stroller of the type having a base frame and an arm rest frame positioned above said base frame the combination of a seat suspended from said arm rest frame, a back rest pivotally mounted with respect to said seat, means limiting pivoting of said back rest from an upright position to a lower position wherein said back rest forms an extension of said seat, a foot rest having a pivotal link connection adjacent each end thereof with said base frame to enable said foot rest to move from a lower position below said seat wherein same supports an infant's feet when said back rest is in the upright position to an upper position wherein said foot rest forms an extension of said seat forming with the back rest and seat a horizontal platform upon which an infant can recline.

3. In a baby stroller of the type having a base frame and an arm rest frame positioned above said base frame, the combination of a seat suspended from said arm rest frame, a back rest pivotally mounted with respect to said seat, means limiting pivoting of said back rest from an upright position to a lower position wherein said back rest forms an extension of said seat, and selectively maintaining said back rest in a position intermediate of the upright and lower positions, a foot rest having a pivotal link connection adjacent each end thereof with said base frame to enable said foot rest to move from a lower position below said seat wherein same supports an infant's feet when said back rest is in the upright position to an upper position wherein said foot rest forms an extension of said seat forming with the back rest and seat, a horizontal platform upon which an infant can recline and movable to an inclined position suitable for supporting an infant's feet when the back rest is in the intermediate position.

4. In a baby stroller of the type having a base frame and an arm rest frame positioned above said base frame, a handle frame connecting said arm rest frame and said base frame, the combination of a seat suspended from said arm rest frame, a back rest pivotally mounted upon said seat, bracket members upon said arm rest frame, means upon said back rest engaging said brackets positioning said back rest selectively in either an upright position, a lower position wherein said back rest forms an extension of said seat or in a position intermediate of the upright and lower positions, a foot rest mounted upon said base frame and movable from a lower position wherein same supports an infant's feet when said back rest is in the upright position to an upper position wherein said foot rest forms an extension of said seat forming with the back rest and seat a platform upon which an infant can recline, and movable to an inclined position suitable for supporting an infant's feet when the back rest is in the intermediate position.

5. In a baby stroller of the type having a base frame and an arm rest frame positioned above said base frame, a handle frame connecting said arm rest frame and said base frame, the combination of a seat suspended from said arm rest frame, a back rest pivotally mounted upon said seat, bracket members upon said arm rest frame each having three grooves therein, pins on said back rest entering the grooves in said bracket members, positioning said back rest selectively in either an upright position, a lower position wherein said back rest forms an extension of said seat or in a position intermediate of the upright and lower positions, a foot rest mounted upon said base frame and movable from a lower position wherein same supports an infant's feet when said back rest is in the upright position to an upper position wherein said foot rest forms an extension of said seat forming with the back rest and seat a platform upon which an infant can recline and movable to an inclined position suitable for supporting an infant's feet when the back rest is in the intermediate position.

6. In a baby stroller of the type having a base frame and an arm rest frame positioned above said base frame, a handle frame connecting said arm rest frame and said base frame, the combination of a seat suspended from said arm rest frame, a back rest pivotally mounted upon said seat, bracket members upon said arm rest frame each having a slot therein and three peripheral grooves, a cross bar on said back rest entering said slots permitting movement of said back rest upwardly with respect to said brackets, pins on said back rest entering the grooves in said bracket members, positioning said back rest selectively in either an upright position, a lower position wherein said back rest forms an extension of said seat or in a position intermediate of the upright and lower positions, a foot rest mounted upon said base frame and movable from a lower position wherein same supports an infant's feet when said back rest is in the upright position to an upper position wherein said foot rest forms an extension of said seat forming with the back rest and seat a platform upon which an infant can recline and movable to an inclined position suitable for supporting an infant's feet when the back rest is in the intermediate position.

7. In a baby stroller of the type having a base frame and an arm rest frame positioned above said base frame the combination of a back rest pivotally mounted with respect to said seat, means limiting pivoting of said back rest selectively from a substantially upright position to a lower position wherein said back rest forms an extension of said seat and to a position intermediate of said upright and lower positions, a foot rest formed of a plurality of spaced rods, and a pair of support rods interlaced between rods of said foot rest and pivotally connected to said base frame, whereby said base frame may be moved from a lower position to an upper position forming an extension of said seat and whereby said foot rest may be inclined with respect to said base frame.

8. In a baby stroller of the type having a base frame and an arm rest frame positioned above said base frame the combination of a back rest pivotally mounted with respect to said seat, means limiting pivoting of said back rest selectively from a substantially upright position to a lower position wherein said back rest forms an extension of said seat and to a position intermediate of said upright and lower positions, a foot rest formed of a plurality of spaced rods, a pair of support rods interlaced between rods of said foot rest and pivotally connected to said base frame, said foot rest bearing upon one of said support rods in the lower position maintaining said foot rest in a position to support the feet of an infant when the back rest is in the upright position, said foot rest being movable to an upper position forming an extension of said seat, stop means engaging the other of said support rods limiting movement of said foot rest beyond this position, and said foot rest being movable to an inclined position to support the feet of an infant when the back rest is in an intermediate position and the last mentioned support rod engaging said stop means to limit further inclination of said foot rest.

9. In a baby stroller of the type having a base frame and an arm rest frame positioned above said base frame, a handle frame connecting said arm rest frame and said base frame, the combination of a seat suspended from said arm rest frame, a back rest pivotally mounted upon said seat, bracket members upon said handle frame each having three grooves therein, pins on said back rest entering the grooves in said bracket members, positioning said back rest selectively in either an upright position, a lower position wherein said back rest forms an extension of said seat, or in a position intermediate of the upright and lower positions, a foot rest formed of a plurality of spaced rods, and a pair of support rods interlaced between rods of said foot rest and pivotally connected to said base frame, whereby said base frame may be moved from a lower position to an upper position forming an extension of said seat and whereby said foot rest may be inclined with respect to said base frame.

10. In a baby stroller of the type having a base frame and an arm rest frame positioned above said base frame, a handle frame connecting said arm rest frame and said base frame, the combination of a seat suspended from said arm rest frame, a back rest pivotally mounted upon said seat, bracket members upon said handle frame each having three grooves therein, pins on said back rest entering the grooves in said bracket members, positioning said back rest selectively in either an upright position, a lower position wherein said back rest forms an extension of said seat or in a position intermediate of the upright and lower positions, a foot rest formed of a plurality of spaced rods, a pair of support rods interlaced between rods of said foot rest and pivotally connected to said base frame, said foot rest bearing upon one of said support rods in the lower position maintaining said foot rest in a position to support the feet of an infant when the back rest is in the upright position, said foot rest being movable to an upper position forming an extension of said seat, stop means engaging the other of said support rods limiting movement of said foot rest beyond this position, and said foot rest being movable to an inclined position to support the feet of an infant when the back rest is in an intermediate position and the last mentioned support rod engaging said stop means to limit further inclination of said foot rest.

11. A baby stroller vehicle or the like, comprising a base frame, an inclined handle frame pivotally mounted upon and extending upwardly from the base frame, a toggle-like linkage connection between said base frame and said handle frame, stop means limiting said movement of said linkage connection over-center and toward said base frame, a latch member pivotally mounted upon said toggle-like linkage connection releasably engageable therewith and engaging with said stop means, an arm rest frame associated with said toggle-like linkage, a seat suspended from said arm rest frame, a back rest pivotally mounted with respect to said seat, means limiting pivoting of said back rest from a substantially upright position to a lower position, a foot rest movable from a lower position to support an infant's feet when said back rest is substantially vertical to an inclined position to support an infant's feet when the back rest is in an intermediate position.

12. A baby stroller vehicle or the like, comprising a base frame, an inclined handle frame pivotally mounted upon and extending upwardly from the base frame, a toggle-like linkage connection between said base frame and said handle frame, stop means limiting said movement of said linkage connection over-center and toward said base frame, a latch member pivotally mounted upon said toggle-like linkage connection releasably engageable therewith and engaging with said stop means, an arm rest frame associated with said toggle-like linkage, a seat suspended from said arm rest frame, a back rest pivotally mounted with respect to said seat, means limiting pivoting of said back rest from an upright position to a lower position wherein said back rest forms an extension of said seat, a foot rest mounted on said base frame and movable from a lower position to support the feet of an infant when the back rest is in the upright position to an upper position forming an extension of said seat, in order that an infant can recline.

13. A baby stroller vehicle or the like, comprising a base frame, an inclined handle frame pivotally mounted upon and extending upwardly from the base frame, a toggle-like linkage connection between said base frame and said handle frame, stop means limiting said movement of said linkage connection over-center and toward said base frame, a latch member releasably engageable with said toggle-like linkage holding same against said stop means, an arm rest frame associated with said toggle-like linkage, a seat suspended from said arm rest frame, a back rest pivotally mounted with respect to said seat, means limiting pivoting of said back rest from an upright position to a lower position wherein said back rest forms an extension of said seat, a foot rest mounted on said base frame and movable from a lower position to support the feet of an infant when the back rest is in the upright position to an upper position forming an extension of said seat, in order that an infant can recline.

14. In a baby stroller of the type having a base frame and an arm rest frame positioned above said base frame, the combination of a seat suspended from said arm rest frame, a back rest pivotally mounted with respect to said seat, means limiting pivoting of said back rest from a substantially vertical position to a substantially horizontal position, a foot rest having a pivotal link connection adjacent each end thereof with said base frame to enable said foot rest to move from a lower substantially horizontal position below said seat to support an infant's feet when said back rest is substantially vertical to an upper substantially horizontal position to support an infant's feet when the back rest is substantially horizontal.

15. In a baby stroller of the type having a base frame and an arm rest frame positioned above said base frame the combination of a seat suspended from said arm rest frame, a back rest pivotally mounted with respect to said seat, means limiting pivoting of said back rest from an upright position to a lower position wherein said back rest forms an extension of said seat, a foot rest having a pivotal link connection adjacent each other thereof with said base frame to enable said foot rest to move from a lower position below said seat wherein same supports an infant's feet when said back rest is in the upright position to an upper position forming with the back rest and seat a horizontal platform upon which an infant can recline.

16. A foldable stroller of the class described, which comprises: a base frame having a front and a rear end, wheels mounted upon said base frame at said front and said rear ends, braces pivotally mounted upon said base frame, a seat support pivotally mounted upon said base frame at points remote from the points of attachment of said braces to said base frame, a seat attached to said seat support, said seat being capable of being collapsed when said seat support is located in a folded position adjacent said base frame, an adjustable seat back attached to said seat support, said seat back being capable of being disposed adjacent said base frame when said seat support is located in a folded position adjacent said base frame, and a foot rest attached to said base frame, said foot rest being capable of being adjusted from a first position to a second position elevated from said first position.

References Cited in the file of this patent

UNITED STATES PATENTS

| 1,093,094 | Adams | Apr. 14, 1914 |
| 1,301,835 | Glenister | Apr. 29, 1919 |
| 2,521,434 | Wickman | Sept. 5, 1940 |
| 2,643,893 | Troendle | June 30, 1953 |
| 2,678,219 | Goodman | May 11, 1954 |